3,580,883
METHOD OF CHEMICAL GROUT PROCESSING
Shigekazu Kasahara, Yuji Takahashi, Takashi Suzuki, Shinichi Umeda, Kazuo Adachi, and Yasuo Fukuda, Tokyo, Japan, assignors to Tekkosha Co., Ltd., Tokyo, Japan
No Drawing. Filed Jan. 14, 1969, Ser. No. 791,137
Claims priority, application Japan, Jan. 18, 1968, 43/2,385
Int. Cl. C08f 45/04
U.S. Cl. 260—41      9 Claims

ABSTRACT OF THE DISCLOSURE

A composition of matter comprising a synthetic resin and a water soluble organic solvent which can dissolve said resin, which composition may also contain cement and/or sodium silicate, is injected into soil. The organic solvent is dissolved away by the ground water which is present in the soil and the remaining solid component fills the spaces in the soil, whereby water paths in the soil are blocked.

BACKGROUND OF THE INVENTION

Field of the invention

The present invention relates to a method of chemical grout processing and, more particularly, relates to the utilization of a synthetic resin and a water-soluble organic solvent which can dissolve said resin in order to make a composition of matter which is useful as a chemical grout.

Description of the prior art

Grout has been used in public and commercial construction and in mines for the purpose of preventing water leakage, for example, at a dam site to prevent flow of water into the excavation and to enable the foundation soil to be hardened.

Chemical grout processing has been widely used when the foundation soil is water penetrable. In the prior art, sodium silicate, polyvinyl compounds or chrom-lignin and the like have been utilized as chemicals for chemical grout processing. However, in grout processing using sodium silicate, it is difficult to provide the resulting foundation soil with sufficient strength because the injected chemicals are apt to be absorbed initially at the surface of the foundation soil and it is difficult to make it possible for the chemicals to reach the interior parts of the foundation soil. In grout processing using polyvinyl compounds, the optimum amounts of the initiator and the accelerator for the polymerization reaction are dependent on the quality of the foundation soil. Therefore, in this type of processing, it is quite difficult to control the polymerization. In grout processing using chrom-lignin, gels are likely to be formed in the foundation soil. However, when the foundation soil is in a frozen or dried condition, gels of poor stability are formed.

SUMMARY OF THE INVENTION

A main object of this invention is to provide an improved composition of matter for grout processing comprising synthetic resin and a water-soluble organic solvent which can dissolve said resin.

Another object of this invention is to provide a chemical grout composition of matter which effectively reinforces the foundation by filling spaces in the soil and blocking water paths in the foundation.

Another object of this invention is to provide a chemical grout composition of matter which can be used for grout processing safely and sanitarily.

The present invention is based on the discovery that a synthetic resin and a water-soluble organic solvent which can dissolve said resin form an especially satisfactory chemical grout composition for the purpose of reinforcing foundations because the chemicals effectively fill the spaces in the soil and block the water paths in the foundation. Accordingly, this invention provides a new chemical grout composition comprising a synthetic resin and a water-soluble organic solvent which can dissolve said resin.

It is preferred that the synthetic resin used in this invention has good durability and strong waterproofing ability and is available at a low cost. Furthermore, it is desired that the said resin be soluble in or be capable of being swelled and fluidized with water-soluble organic solvents.

Generally, as the preferred synthetic resins, vinyl chloride copolymers, methacrylate copolymers, or resin containing either of above-mentioned copolymers, as the main component, are recommended.

Synthetic resins which are obtained by copolymerizing vinyl chloride with fatty acid vinyl esters such as vinyl acetate, vinyl propionate or the like, acrylic acid esters such as methyl acrylate, ethyl acrylate, or the like, vinylidene chloride, maleic acid esters, vinyl ethers, or the like are the effective vinyl chloride copolymers for the purpose of this invention.

Synthetic resins which are obtained by copolymerizing methyl methacrylate or ethyl methacrylate with lower fatty acid vinyl esters such as vinyl acetate, vinyl propionate, vinyl butyrate or the like, acrylic acid esters such as methyl acrylate, ethyl acrylate, styrene, vinylidene chloride, or the like, are the effective methacrylate copolymers for the purpose of this invention.

These copolymers can be produced by the well-known processes of polymerization such as suspension, emulsion or solution polymerization, or the like. Depending on the purpose of the grouting, one or more than one of the components selected from the group consisting of organic materials including polyester resin, xylene resin, ketone resin, chlorinated polyolefins, chlorinated rubber, plasticizers or the like or inorganic materials such as gypsum, sand, calcium carbonate, sodium silicate, portland cement, or the like can be effectively added to the above-mentioned grout composition. Especially, a cement-containing grout composition provides great strength for the treated foundation. A sodium silicate-containing grout composition is especially suitable for the purpose of grout processing of deep foundations.

The weight ratio of the cement, when used, is generally in the range of from about 0.1 to about 4 percent by weight, preferably about 0.5 to 3 percent by weight, based on the weight of the resin. The weight ratio of sodium silicate is generally in the range of from about 1 percent to about 20 percent by weight, preferably about 5 to 15 percent by weight, based on the weight of the resin component. Mixtures of cement and sodium silicate can be used.

The desirable solvents according to this invention are acetone, diacetone alcohol, methoxy methyl pentanol and ethers or esters of diols such as methyl Cellosolve acetate, ethyl Cellosolve or the like. The preferred diols include ethylene glycol, diethylene glycol, propylene glycol, dipropylene glycol or the like. Methyl Cellosolve, methyl Cellosolve acetate, ethyl Cellosolve, Cellosolve acetate, butyl Cellosolve, ethylene glycol monoacetate, methyl Carbitol, ethyl Carbitol, Carbitol acetate, butyl Carbitol, diethylene glycol dimethyl ether, methyl ethyl Carbitol, diethyl Carbitol, propylene glycol monomethyl ether, dipropylene glycol monomethyl ether or the like are the preferred diol derivatives for the purpose of this invention. Cellosolve is a trademark for various glycol ethers and esters. Carbitol is a trademark for various diethylene glycol ethers. A chemical grout composition which uses these diol derivatives as the solvent has a high flash point and low volatility. Therefore, it is suitable for grouting in tunnels or other sites having poor ventilation.

When gradual deposition of the resin is desired, the addition of hydrophobic solvents such as toluene, ethyl acetate, methyl ethyl ketone or the like, or when the swift deposition is desired, the addition of methanol, ethanol, small quantities of water or the like, are sometimes effective, respectively. The optimum blending ratio of [solvent/synthetic resin] is varied according to the types of resin and solvent employed and also the purpose of the grouting, but the preferable ratio is in the range of 0.8 to 20 parts by weight of solvent to one part of resin.

The mechanism of preventing water leakage or suppression of welling forth of water by the chemicals of this invention is as follows:

The water-soluble organic solvent in the composition contacts the water in the soil first so that the solvent is dissolved away by the ground water. The remaining synthetic resin is deposited and coagulated in the spaces in the soil, and the water paths in the foundation soil are filled with the thus solidified resin.

Therefore, as the amount of water flow in the soil increases, the grouting effect of the composition of this invention also increases. This is the most unique and useful property of the grouting chemical of this invention and quite differs from the property of conventional grouting compositions.

DESCRIPTION OF THE PREFERRED EMBODIMENTS

The present invention is further illustrated by the following non-limitative examples.

EXAMPLE 1

Into an open-topped cylindrical container having an inside diameter of 125 mm., a height of 200 mm. and which was equipped with an adjusting drain cock at the bottom, there was placed sand to a level of 82 mm. from the bottom. Water was poured into the container at a rate of 160 ml./min. from the top and the water level was maintained at the upper surface of the sand by adjusting the drain cock.

By using a pipet, 100 ml. of a composition which was prepared by dissolving vinyl chloride copolymer (vinyl chloride 70 wt. percent-vinyl propionate 30 wt. percent, $\bar{P}$; 400) in acetone and adjusting the solid content to be 40 wt. percent, was injected into five sections of the bottom of sand layer. The water flow from the drain cock was stopped immediately. After the grout processing was completed, the particles of sand were bonded together and a rigid cylinder of sand was formed.

EXAMPLE 2

Into the same device in Example 1, there was placed fine gravel, water was poured in at a rate of 200 ml./min. and the water level was maintained constant by means of the same procedure as described in Example 1.

Into the thus arranged gravel layer, there was injected 500 g. of a composition which was prepared by dissolving vinyl chloride copolymer (vinyl chloride 60 wt. percent-vinyl acetate 40 wt. percent, $\bar{P}$; 500) in a mixed solvent consisting of acetone (70 wt. percent), ethyl acetate (25 wt. percent) and water (5 wt. percent). The solid content was 35 wt. percent. The water flow from the drain cock was stopped immediately.

After the grout processing was completed, the spaces in the gravel layer were completely filled and the particles of gravel were bonded tightly by the resin.

EXAMPLE 3

Into an open-topped drum (ca. 200 l. volume) which was equipped with an adjusting drain cock at the bottom, there was placed a mixture of 80 l. of sand and 80 l. of gravel. Water was poured in at a rate of 1 l./min. from the top and the water level was kept level with the surface of sand-gravel mixed layer by adjusting the drain cock.

Into the thus arranged sand-gravel mixed layer, there was injected 50 l. of a composition which was prepared by adding a mixture consisting of 100 parts by weight of vinyl chloride copolymer (vinyl chloride 80 wt. percent-vinyl acetate 10 wt. percent-vinyl propionate 10 wt. percent $\bar{P}$; 450), 10 parts by weight of dioctyl phthalate and 200 parts by weight of portland cement dissolved in a mixed solvent consisting of acetone (90 wt. percent) and ethyl acetate (10 wt. percent). The solid content in the resultant mixture was 25 wt. percent. This mixture was injected into the sand-gravel layer under a pressure of 3 kg./cm.$^2$ As a result, flowing out of the cement and water was stopped in a moment. Each particle of the sand and gravel was bonded together by the resin component first and the bonding strength was enhanced with the passage of time by the cement component.

EXAMPLE 4

Into the same device as described in Example 3, there was placed 180 l. of fine gravel. Water was poured in and the water level was kept constant by means of the same procedure as described in Example 3. The following two compositions (A and B) were prepared.

Composition A: This was prepared by adding a mixture consisting of 90 parts by weight of vinyl chloride copolymer (vinyl chloride 70 wt. percent-vinyl acetate 30 wt. percent), 10 parts by weight of chlorinated polypropylene and 300 parts by weight of portland cement in a mixed solvent consisting of acetone (55 wt. percent), methyl ethyl ketone (10 wt. percent), and toluene (35 wt. percent). The solid content in the resultant mixture was 30 wt. percent.

Composition B: This was prepared by mixing 100 parts by weight of sodium silicate and 100 parts by weight of water.

Into the gravel layer in the drum, 50 l. of Composition A and 50 l. of Composition B were simultaneously injected through the same pipe line. As a result, the gravel particles were combined or bonded together so that a rigid block was made and water flow stopped immediately.

EXAMPLE 5

Into an open-topped cylindrical container, 125 mm. in inside diameter, 200 mm. in height and equipped with an adjusting drain cock at the bottom, there was placed sand to a level of 82 mm. from the bottom. Water was poured in from the top at a rate of 160 ml./min. and the water level was kept at just the upper surface of sand by adjusting the drain cock.

By using a pipet, 300 ml. of a composition was injected into the sand. The composition was prepared by dissolving vinyl chloride copolymer (vinyl chloride 70 wt. percent-vinyl propionate 30 wt. percent, $\bar{P}$; 450) in ethyl Cellosolve and adjusting the solid content to be 10%. The composition was injected into five sections of the bottom of the sand layer. The water flow from the drain cock stopped immediately.

After the grout processing was completed, each particle of sand was bonded together and a rigid cylinder of sand was formed. The flash point of the chemical was approximately 65° C. and the grouting could be performed in safety.

EXAMPLE 6

Into the same device as described in Example 5, there was placed fine gravel. Water was poured in from the top at a rate of 200 ml./min., and the water level was kept at just the upper surface of gravel by adjusting the drain cock.

Into the thus arranged gravel layer, 800 g. of a composition was injected. The composition was prepared by dissolving vinyl chloride copolymer (vinyl chloride 60 wt. percent-vinyl acetate 40 wt. percent, $\bar{P}$; 400) in a mixed solvent consisting of methyl Cellosolve (50 wt. percent), methyl Cellosolve acetate (40 wt. percent), butyl Carbitol (10 wt. percent) and having a solid content of 20% by weight. The water flow from the drain cock stopped immediately.

After the grout processing was completed, the spaces in the gravel layer were competely filled and each particle of gravel was bonded together tightly by the resin.

EXAMPLE 7

In the same device as described in Example 5, there was placed fine gravel, 200 ml./min. of water was poured in from the top and the water level was kept at just the upper surface of gravel by adjusting the drain cock.

Into the thus arranged gravel layer, 1 kg. of a composition was injected. The composition was prepared by dissolving vinyl chloride copolymer (vinyl chloride 70 wt. percent-vinyl propionate 20 wt. percent-vinyl acetate 5 wt. percent-ethyl acrylate 4 wt. percent-dioctyl maleate 1 wt. percent) in a mixed solvent consisting of methyl Cellosolve (15 wt. percent), ethyl Cellosolve (62 wt. percent), propylene glycol monomethyl ether (10 wt. percent), ethylene glycol monoacetate (10 wt. percent) and ethyl acetate (3 wt. percent). The solid content was 15% by weight. The water flow from the drain cock stopped immediately.

The flash point of the composition was 60° C. and sufficient safety was maintained during the processing.

EXAMPLE 8

Into an open-topped drum (ca. 200 l. volume) which was equipped with an adjusting drain cock at the bottom, there was placed a mixture of 80 l. of sand and 80 l. of gravel. Water was poured in at a rate of 1 l./min. from the top and the water level was kept at just the surface of sand-gravel mixed layer by adjusting the drain cock.

Into the thus arranged sand-gravel mixed layer, 100 l. of a composition was injected. The composition was prepared by adding a mixture consisting of 100 parts by weight of vinyl chloride copolymer (vinyl chloride 80 wt. percent-vinyl acetate 10 wt. percent-vinyl propionate 10 wt. percent, $\overline{P}$; 350) and 200 parts by weight of portland cement in a mixed solvent consisting of Cellosolve (90 wt. percent), Methyl Cellosolve acetate (10 wt. percent). The solid content of the resultant mixture was 20 wt. percent. The injection was carried out under a pressure of 3 kg./cm.$^2$.

As a result, flowing out of cement and water, which was observed just after the injection started, was stopped in a moment. Each particle of said and gravel was united by the resin component first and the adhesive strength was enhanced with the passage of time by the cement component.

EXAMPLE 9

Into the same device as described in Example 8, there was placed 180 l. of fine gravel, and water was poured in by means of the same procedure as described in Example 8. The following two compositions (A and B) were prepared.

Composition A: This was prepared by adding a mixture consisting of 90 parts by weight of vinyl chloride copolymer (vinyl chloride 70 wt. percent-vinyl acetate 30 wt. percent). 10 parts by weight of chlorinated polypropylene and 300 parts by weight of portland cement in a mixed solvent consisting of methyl Cellosolve acetate (10 wt. percent), Cellosolve (70 wt. percent), methyl Carbitol (10 wt. percent) and toluene (10 wt. percent). The solid content in the resultant mixture was 20 wt. percent.

Composition B: This was prepared by mixing 100 parts by weight of sodium silicate and 100 parts by weight of water.

Into the gravel layer in the drum, 50 l. of Composition A and 50 l. of Composition B were simultaneously injected through the same pipe line.

As a result, water flow was stopped in a moment by the effective cooperation of the resin, cement and sodium silicate.

EXAMPLE 10

Into an open-topped cylindrical container, 125 mm. in inside diameter, 200 mm. in height and equipped with an adjusting drain cock at the bottom, there was placed sand to a level of 82 mm. from the bottom. Water was poured in at the rate of 160 ml./min. from the top and the water level was kept at just the upper surface of the sand by adjusting the drain cock.

By using a pipet, 100 ml. of a composition was injected. The composition was prepared by dissolving methacrylate copolymer (methyl methacrylate 50 wt. percent-styrene 50 wt. percent) in acetone. The solid content in the resultant mixture was 40 wt. percent. The composition was injected into five sections of the bottom of the sand layer. The water flow from the drain cock stopped immediately.

After the grout processing was completed, each particle of sand was united together and a rigid cylinder of sand was formed.

EXAMPLE 11

Into the same device as described in Example 10, there was placed fine gravel, water was poured in at a rate of 200 ml./min. and the water level was maintained constant by means of the same procedure as described in Example 10.

Into the thus arranged gravel layer, 500 g. of a composition was injected. The composition was prepared by dissolving methacrylate copolymer (methyl methacrylate 40 wt. percent-vinyl acetate 40 wt. percent-styrene 20 wt. percent) in a mixed solvent consisting of acetone (50 wt. percent) and ethyl Cellosolve (50 wt. percent). The solid content in the resultant mixture was 35 wt. percent. The water flow from the drain cock stopped immediately.

After the grout processing was completed, the spaces in the gravel layer were completely filled and the particles of gravel were bonded together tightly by the resin.

EXAMPLE 12

Into an open-topped drum (ca. 200 l. volume), which was equipped with an adjusting drain cock at the bottom, there was placed a mixture of 80 l. of sand and 80 l. of gravel. Water was poured in at a rate of 1 l./min. from the top and the water level was kept at just the surface of sand-gravel mixed layer by adjusting the drain cock.

Into the thus arranged sand-gravel mixed layer, there was injected 50 l. of a composition. The composition was prepared by adding a mixture consisting of 100 parts by weight of methacrylate copolymer (methyl methacrylate 30 wt. percent-ethyl methacrylate 5 wt. percent-vinyl propionate 35 wt. percent-styrene 30 wt. percent), 10 parts by weight of dioctyl phthalate and 200 parts by weight of portland cement in a mixed solvent consisting of acetone (50 wt. percent), Cellosolve (40 wt. percent) and ethyl acetate (10 wt. percent). The solid content in the resultant mixture was 25 wt. percent. The composition was injected under a pressure of 3 kg./cm.$^2$.

As a result, flowing out of cement and water was stopped in a moment. Each particle of sand and gravel was united together by the resin component first and the adhesive strength was enhanced with the passage of time by the cement component.

EXAMPLE 13

Into the same device as described in Example 12, there was placed 180 l. of fine gravel and water was poured in by means of the same procedure as described in Example 12.

The following two compositions (A and B) were prepared.

Composition A: This was prepared by adding a mixture consisting of 90 parts by weight of methacrylate copolymer (methyl methacrylate 40 wt. percent-ethyl acrylate 30 wt. percent-vinyl propionate 30 wt. percent.), 10 parts by weight of chlorinated polypropylene and 300 parts by weight of portland cement in a mixed solvent consisting of acetone (20 wt. percent), methyl Cellosolve acetate (10 wt. percent), Cellosolve (50 wt. percent), methyl ethyl ketone (10 wt. percent) and toluene (10 wt. percent). The solid content in the resultant mixture was 30 wt. percent.

Composition B: This was prepared by mixing 100 parts by weight of sodium silicate and 100 parts by weight of water.

Into the gravel layer in the drum, 50 l. of Composition A and 50 l. of Composition B were injected simultaneously through the same pipe line.

As the result, the gravel particles were united so that a rigid block was made and water flow was stopped immediately.

The embodiments of the invention in which an exclusive property or privilege is claimed are defined as follows:

1. A method for the chemical grout processing of soil containing water, which comprises injecting into the soil a solution obtained by dissolving in a water-soluble solvent, solid ingredients comprising a major amount of copolymer having strong waterproofing ability selected from the group consisting of vinyl chloride copolymer and methacrylate copolymer wherein the ratio of said solvent to said copolymer is in a range of 0.8–20 parts by weight of solvent to one part of copolymer and contacting said solution with said water to remove said solvent and cause deposition and solidification of copolymer in the spaces in the soil.

2. A method in accordance with claim 1, wherein said vinyl chloride copolymer is a copolymer of a vinyl chloride monomer with at least one additional monomer selected from the group consisting of vinyl acetate, vinyl esters of fatty acids, esters of acrylic acids, vinylidene chloride, esters of maleic acid and vinyl ethers.

3. A method in accordance with claim 1, wherein said methacrylate copolymer is a copolymer of a first monomer selected from the group consisting of methyl methacrylate and ethyl methacrylate and mixtures thereof with at least one additional monomer selected from the group consisting of vinyl esters of lower fatty acids, esters of acrylic acids, styrene and vinylidene chloride.

4. A method in accordance with claim 1, wherein said water-soluble organic solvent consists of at least one member selected from the group consisting of acetone, diacetone alcohol, methoxy methyl pentanol and ethers and esters of ethylene glycol, diethylene glycol, propylene glycol and dipropylene glycol.

5. A method in accordance with claim 2, wherein the water-soluble organic solvent consists of at least one member selected from the group consisting of acetone, diacetone alcohol, methoxy methyl pentanol and ethers and esters of ethylene glycol, diethylene glycol, propylene glycol and dipropylene glycol.

6. A method in accordance with claim 3, wherein the water-soluble organic solvent consists of at least one member selected from the group consisting of acetone, diacetone alcohol, methoxy methyl pentanol and ethers and esters of ethylene glycol, diethylene glycol, propylene glycol and dipropylene glycol.

7. A method in accordance with claim 1, wherein cement is mixed with the solution in an amount of from about 0.01 to about 4 parts by weight per 100 parts by weight of said copolymer.

8. A method in accordance with claim 1, wherein sodium silicate is mixed with the solution in an amount of from about 1 to about 20 parts by weight per 100 parts by weight of said copolymer.

9. A method in accordance with claim 1, in which the solution consists essentially of a solution of said copolymer in a water soluble solvent for said copolymer.

References Cited
UNITED STATES PATENTS

| | | | |
|---|---|---|---|
| 2,652,379 | 9/1953 | Hedrick et al. | 260—41 |
| 2,768,563 | 10/1956 | Immerman | 260—41A |
| 3,016,358 | 1/1962 | Hustinx | 260—41A |

OTHER REFERENCES

AM-9 Chemical Grout, American Cyanamid, New York, received U.S. Patent Office, Oct. 19, 1959, pages 22–23, 61/36.

Preuss, Harold P.: Synthetic Resins in Coatings 1965, Noyes Development Corp., pages 46–49, TP 978 P66C4.

Penn, W. S.: PVC Technology, Maclaren & Sons, Ltd., London, 1966, pages 13 and 371, TP 1180.V48 P4 1966 C3.

MORRIS LIEBMAN, Primary Examiner

J. H. DERRINGTON, Assistant Examiner

U.S. Cl. X.R.

61—36